3,684,654
PROCESS FOR PRODUCING L-THREONINE
Kiyoshi Nakayama, Sagamihara-shi, Haruo Tanaka, Machida-shi, and Hiroshi Kase, Koganei-shi, Japan, assignors to Kyowa Hakko Kogyo Co., Ltd., Tokyo, Japan
No Drawing. Continuation of application Ser. No. 696,512, Jan. 9, 1968. This application June 17, 1968, Ser. No. 737,303
Int. Cl. C12d *13/06*
U.S. Cl. 195—29      2 Claims

ABSTRACT OF THE DISCLOSURE

The process for the production of L-threonine by fermentation which comprises culturing Escherichia microorganisms that require diaminopimelic acid and isoleucine for their growth in an aqueous nutrient medium under aerobic conditions. Yields of about 5–10 g./l. are obtained.

CROSS-REFERENCE TO RELATED APPLICATION

This application is a continuation of copending application Ser. No. 696,512, filed on Jan. 9, 1968.

This invention relates to a process for producing L-threonine. More particularly, it relates to a process for the production of L-threonine by fermentation. Even more particularly, the invention relates to a process for the production of L-threonine by fermentation with microorganisms belonging to the genus Escherichia.

As is well known in the art, L-threonine is an amino acid which is important as a so-called essential amino acid for the nourishment of humans and animals. It is used medically as a nutrient. L-threonine is contained in a small amount in cereal proteins and is a markedly useful substance as an amino acid which improves the nutritive values of cereal proteins when these are supplemented therewith.

Synthesis methods have been exclusively used heretofore for producing L-threonine. While methods for producing L-threonine by fermentation have been attempted, these methods employ L-homoserine as a main starting material [U.S. Pat. 3,099,604, Japanese patent publication 2896/61 and Sugahara et al., "Amino Acid and Nucleic Acid," vol. 10, 68 (1964)]. However, L-homoserine is an expensive compound. Other fermentation methods produce only small amounts of L-threonine in the culture liquors (U.S. Pat. 2,937,121 and U.S. Pat. 2,937,122), and a commercial scale practice of these methods has not been achieved.

One of the objects of the present invention is to provide an improved process for the production of L-threonine which overcomes the disadvantages and deficiencies of the prior art methods.

Another object of the present invention is to provide a process for producing L-threonine by fermentation which may be carried out in an efficacious and simple manner.

A further object of the invention is to provide a process for producing L-threonine by fermentation which may be carried out advantageously on an industrial scale at low cost to give a high yield of product.

A still further object of the invention is to provide L-threonine.

These and other objects and advantages of the present invention will become apparent to those skilled in the art from a consideration of the following specification and claims.

Noting the advantages that the L-form of amino acid is produced in the production of amino acids by fermentation, in general, and that optical resolution, which is difficult in a synthesis process, is not necessary, the present inventors have found that when the specific micro-organisms described hereinbelow are aerobically cultured in nutrient media substantial amounts of L-threonine are produced and accumulated in the resultant culture liquids. Accordingly, the present inventors have found an industrially excellent method for producing L-threonine in which the amounts thereof produced in the culture liquors vary from about 5 to 10 g./l., as shown in the examples hereinbelow, these amounts being markedly greater than the small values obtained in the prior art, for example, 1.0–1.5 g./l. (U.S. Pat. 2,937,121) and 2–3 g./l. (U.S. Pat. 2,937,122).

The microorganisms employed in the present invention belong to the genus Escherichia and are strains which require for their growth at least both diaminopimelic acid and isoleucine, as well as strains which require at least diaminopimelic acid (excluding methionine-requiring strains), the latter having been obtained from the former strains through back-mutation and thus having been deprived of the isoleucine-requiring property. Strains having these characteristics can be readily obtained by applying to stock strains or isolated strains belonging to the genus Escherichia an artificial variation treatment, such as ultraviolet ray irradiation, $\gamma$-ray irradiation or a chemical treatment. These treatments may be carried out either independently or in combination with a means such as a method for concentrating the nutritional requirement of the mutated cells using penicillin. Or, in order to obtain the back-mutant, the artificial variation treatment may be combined with a procedure involving modern microbiological genetics such as screening in a medium which contains none of the required growth substances.

The microorganisms employed in the present invention are those which require diaminopimelic acid and other nutrients, as discussed above. Therefore, the medium to be used in the present invention should initially contain diaminopimelic acid or diaminopimelic acid together with isoleucine, together with other required substances if necessary.

The strains employed in the present invention have been deposited with the American Type culture Collection and are identified in the Catalog of Cultures as *Escherichia coli* KY 8281 ATCC 21149 and *Escherichia coli* KY 8283 ATCC 21151.

The concentration of diaminopimelic acid employed in the nutrient medium is preferably 10 mg./l.–300 mg./l. The amount of isoleucine, in the case where a strain simultaneously requiring isoleucine is used, is preferably 10 mg./l.–200 mg./l. in the nutrient medium.

In addition to the specific nutritional requirements discussed above, the media and the conditions of culturing generally employed for the cultivation of microorganisms are utilized. Accordingly, either a synthetic culture medium or a natural nutrient medium is suitable in the present invention as long as it contains the essential nutrients for the growth of the strain employed. Such nutrients are well known in the art and include substances such as a carbon source, a nitrogen source, inorganic compounds and the like which are utilized by the microorganism employed in appropriate amounts. Thus, as a carbon source, there may be mentioned, by way of example, carbohydrates such as glucose, maltose, sucrose, etc., or any other suitable carbon source such as glycerol, mannitol, sorbitol, organic acids, etc. These substances may be used either singly or in mixtures of two or more. As a nitrogen source, various kinds of inorganic or organic salts or compounds, such as urea or ammonium salts such as ammonium chloride, ammonium sulfate, ammonium nitrate, ammonium phosphate, etc., or natural substances containing nitrogen, such as corn-steep liquor, yeast extract, meat extract, peptone, fish meal, bouillon, casein hydrolysates, casamino acid, fish solubles, rice bran extract, etc. may be employed. Again, these substances may be used either singly or in combinations of two or more. Inorganic compounds which may be added to the culture medium includes magnesium sulfate, sodium phosphate, potassium dihydrogen phosphate, potassium mono-hydrogen phosphate, iron sulfate, sodium chloride, manganese chloride, calcium chloride, or other suitable salts of magnesium, iron, manganese, zinc, calcium and the like. Mixtures of the inorganic compounds may be employed.

The fermentation employed herein to obtain L-threonine is conducted under aerobic conditions, such as aerobic shaking of the culture or with stirring of a submerged culture with aeration, at a temperature of about 20° to 40° C. and at a pH of about 5.0 to 8.5. After about two to four days of culturing under these conditions, substantial amounts of L-threonine are produced and accumulated in the culture liquor.

After the completion of fermentation, the L-threonine is separated from the fermentation liquor by conventional means, such as ion exchange resin treatment, precipitation with metallic salts, chromatography or the like.

The following examples are given merely as illustrative of the present invention and are not to be considered as limiting. Unless otherwise noted, the percentages therein and throughout the application are by weight per liter of water.

Example 1

*Escherichia coli* ATCC 21151 (requiring both diaminopimelic acid and isoleucine) is used as the seed strain. This strain is cultured under aerobic conditions for 24 hours in a seed medium having a composition of 20 g./l. of glucose, 10 g./l. of peptone, 10 g./l. of yeast extract, 2.5 g./l. of NaCl and 50 mg./l. of diaminopimelic acid. The resultant cultured strain is inoculated, in a ratio of 10% by volume, into a 250 ml. triangular flask containing 20 ml. of a fermentation medium having the following composition:

50 g./l. sucrose
14 g./l. $(NH_4)_2SO_4$
1 g./l. $KH_2PO_4$
0.3 g./l. $MgSO_4 \cdot 7H_2O$
20 g./l. $CaCO_3$
25 mg./l. L-isoleucine The pH of this medium is 7.2.

Culturing is then carried out with aerobic shaking of the culture at 30° C. for 96 hours. After cultivation for 96 hours, the amount of L-threonine accumulated in the culture liquor is 10.2 mg./ml.

The L-threonine in the culture liquor is recovered by ion exchange resin treatment after removing the mycelia and $CaCO_3$ from the culture liquor.

Example 2

*Escherichia coli* ATCC 21151 (requiring both diaminopimelic acid and isoleucine) is used as the seed strain. The cultivation of the strain is effected in the same media and in the same manner as described in Example 1, except that 50 g./l. of sorbitol is used in the fermentation medium composition instead of sucrose. The amount of L-threonine accumulated in the culture liquor at the completion of fermentation is 6.5 mg./ml.

Example 3

*Escherichia coli* ATCC 21149 ( a diaminopimelic acid-requiring strain, which has been obtained by back-mutation from a diaminopimelic acid and isoleucine-requiring strain, i.e. *Escherichia coli* ATCC 21151) is used as the seed strain. The cultivation of the strain is effected in the same media and in the same manner as described in Example 1, except that the concentration of sucrose is changed to 50 g./l., the concentration of diaminopimelic acid is changed to 100 mg./l. and no L-isoleucine is employed in the fermentation medium composition. At the completion of fermentation, the amount of L-threonine accumulated in the culture liquor is 5.3 mg./ml.

Example 4

Cultivation is effected with the same strain and in the same media and under the same conditions as described in Example 3, except that 50 g./l. of mannitol is used instead of sucrose in the composition of the fermentation medium. At the completion of fermentation, the amount of L-threonine found to be accumulated in the culture liquor is 6.3 mg./ml.

The invention being thus described, it will be obvious that the same may be varied in many ways. Such variations are not to be regarded as a departure from the spirit and scope of the inventon, and all such modifications are intended to be included within the scope of the following claims.

We claim:

1. A process for the production of L-threonine by fermentation which comprises culturing in an aqueous nutrient medium under aerobic conditions *Escherichia coli* ATCC 21151, said nutrient medium containing at least diaminopimelic acid and isoleucine, accumulating L-threonine in the resultant culture liquor, and recovering the L-threonine from said culture liquor.

2. A process for the production of L-threonine by fermentation which comprises culturing in an aqueous nutrient medium under aerobic conditions a microorganism capable of producing threonine and belonging to the genus Escherichia, said microorganism being mutants requiring for their growth at least both diaminopimelic acid and isoleucine, said nutrient medium containing from 10 mg./l. to 300 mg./l. of diaminopimelic acid and from 10 mg./l. to 200 mg./l. of L-isoleucine, accumulating L-threonine in the resultant culture liquor and recovering the L-threonine from said culture liquor.

References Cited

UNITED STATES PATENTS 2,937,121  5/1960  Huang _____ 195—47

OTHER REFERENCES

Huang, H. T.: Applied Microbiology, vol. 9, No. 5, p. 419, Production of L-Threonine by Auxotropic Mutants of *Escherichia Coli*.

A. LOUIS MONACEL, Primary Examiner

G. M. NATH, Assistant Examiner

U.S. Cl. X.R.
195—47, 30